US008284026B2

(12) United States Patent
Ivanov et al.

(10) Patent No.: US 8,284,026 B2
(45) Date of Patent: Oct. 9, 2012

(54) ACTIVE BADGE LOCALIZATION USING PASSIVE SENSORS

(75) Inventors: Yuri Ivanov, Arlington, MA (US); Abraham Goldsmith, Boston, MA (US); Jay Thornton, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 300 days.

(21) Appl. No.: 12/696,254

(22) Filed: Jan. 29, 2010

(65) Prior Publication Data

US 2011/0187502 A1 Aug. 4, 2011

(51) Int. Cl.

| | |
|---|---|
| ***G08B 5/22*** | (2006.01) |
| ***G08B 13/00*** | (2006.01) |
| ***G08B 19/00*** | (2006.01) |
| ***G08B 21/00*** | (2006.01) |
| ***G08B 23/00*** | (2006.01) |
| ***G05B 23/02*** | (2006.01) |
| ***G05B 19/00*** | (2006.01) |
| ***G05B 23/00*** | (2006.01) |
| ***G06F 7/00*** | (2006.01) |
| ***G06F 7/04*** | (2006.01) |
| ***G06K 19/00*** | (2006.01) |

(52) U.S. Cl. ............ 340/6.1; 340/3.7; 340/5.3; 340/500

(58) Field of Classification Search .................. 340/6.1, 340/3.7, 5.3, 500

See application file for complete search history.

(56) References Cited

U.S. PATENT DOCUMENTS

| | | | | |
|---|---|---|---|---|
| 6,513,015 | B2 * | 1/2003 | Ogasawara | 705/26.1 |
| 7,138,902 | B2 * | 11/2006 | Menard | 340/5.53 |
| 7,295,119 | B2 * | 11/2007 | Rappaport et al. | 340/572.4 |
| 7,323,991 | B1 * | 1/2008 | Eckert et al. | 340/572.1 |
| 7,450,024 | B2 * | 11/2008 | Wildman et al. | 340/669 |
| 7,486,183 | B2 * | 2/2009 | Luebke et al. | 340/506 |
| 7,538,666 | B2 * | 5/2009 | Campman | 340/539.13 |
| 7,592,909 | B2 * | 9/2009 | Zaruba et al. | 340/539.13 |
| 7,746,226 | B2 * | 6/2010 | Cohen et al. | 340/539.13 |
| 2010/0123560 | A1 * | 5/2010 | Nix et al. | 340/10.4 |

* cited by examiner

*Primary Examiner* — Daniel Wu
*Assistant Examiner* — Emily C Terrell
(74) *Attorney, Agent, or Firm* — Dirk Brinkman; Gene Vinokur

(57) ABSTRACT

A network in an environment includes passive sensors with associated sensor identification numbers. A set of active badges with associated badge identification numbers, wherein each badge is associated with an object, and wherein a particular sensor broadcasts a packet in response to detecting a particular object, wherein the packet includes the sensor identification number and a time, and only if the particular object is associated with a particular badge then the badge appends the badge identification number to the packet and broadcasts the appended packet, and the particular sensor receives and rebroadcasts the appended packet for further processing to passively and actively monitor the environment.

16 Claims, 2 Drawing Sheets

100

200

100

200

ACTIVE BADGE LOCALIZATION USING PASSIVE SENSORS

FIELD OF THE INVENTION

This invention relates generally to security systems, and more particularly to a security system with passive and active components.

BACKGROUND OF THE INVENTION

A security system is active when persons are willing to have their activities monitored. Otherwise, the security system is passive.

Passive security systems typically use cameras, microphones and motion sensors. In passive systems, it is difficult to identify the persons in the environment being monitored. For example, a complex and expensive face recognition subsystem may need to be employed in the environment to identify people. This makes it difficult to deploy and maintain passive systems in large environments requiring, perhaps, hundreds if not thousands of cameras. In general, most conventional passive security systems are incapable of reliably identifying people in a large scale environment.

Active systems typically use access control panels, keyboards, fingerprint detectors, security cards, or badges to positively identify people in the environment. The problem with active systems is that it is difficult, if not impossible, to distribute identification means to a large population. If the environment is also accessible to the general public the positive pre-identification of all people is impossible. Also, the people in the environment often need to directly interact with an authentication device, which may be inconvenient.

Therefore, there is a need for an inexpensive and simple system that can concurrently distinguish between friend and foe in large environments.

SUMMARY OF THE INVENTION

A network in an environment includes passive sensors with associated sensor identifications.

A set of active badges with associated badge identification, wherein each badge is associated with an object.

A particular sensor broadcasts a packet in response to detecting a particular object. The packet includes the sensor identification and a time, and only if the particular object is associated with a particular badge then the badge appends the badge identification to the packet and broadcasts the appended packet, and the particular sensor receives and rebroadcasts the appended packet for further processing to passively and actively monitor the environment.

DETAILED DESCRIPTION OF THE PREFERRED EMBODIMENTS

Figure 1:
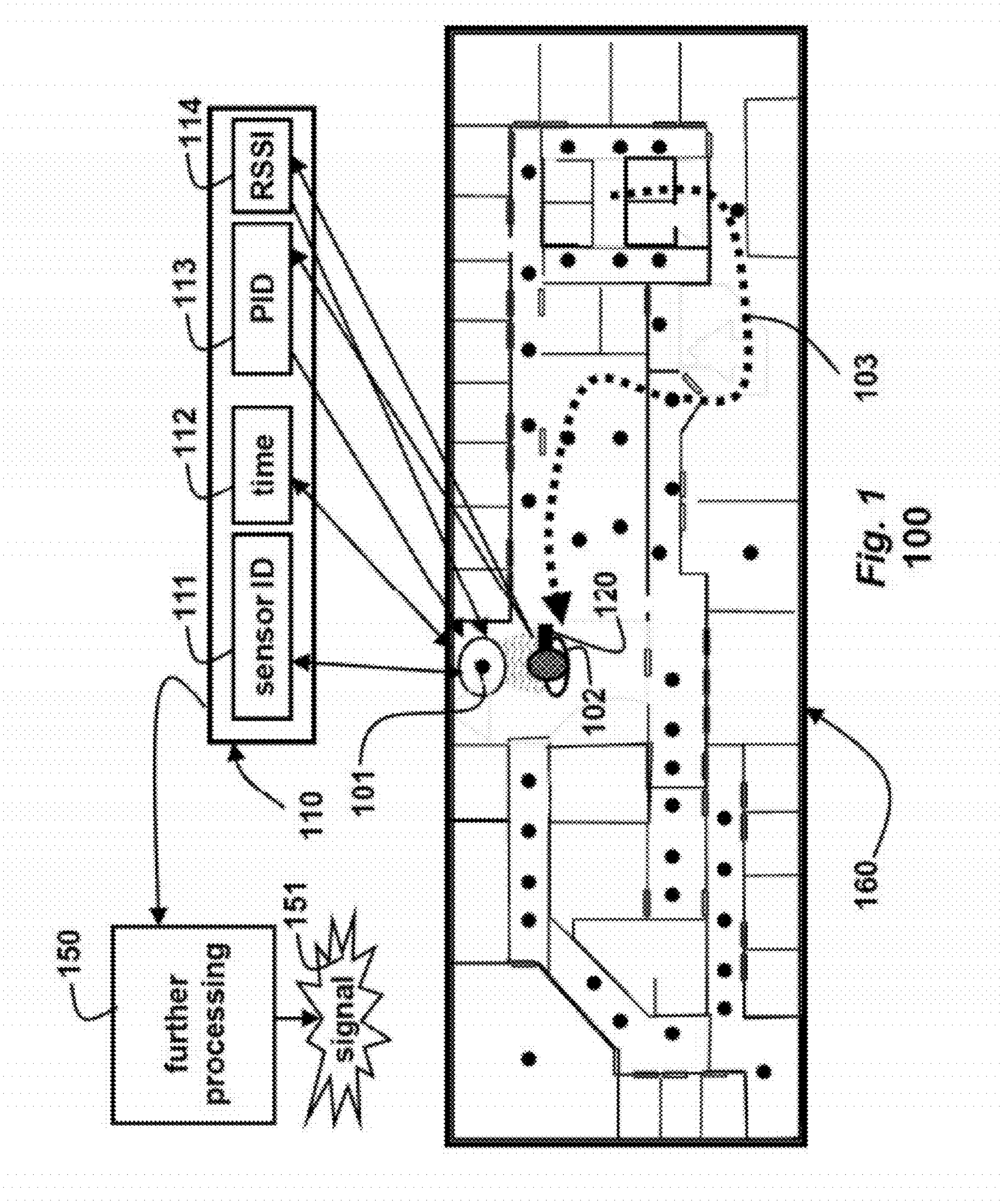
FIG. 1 is a schematic of a security system according to embodiments of the invention.
Figure 2:
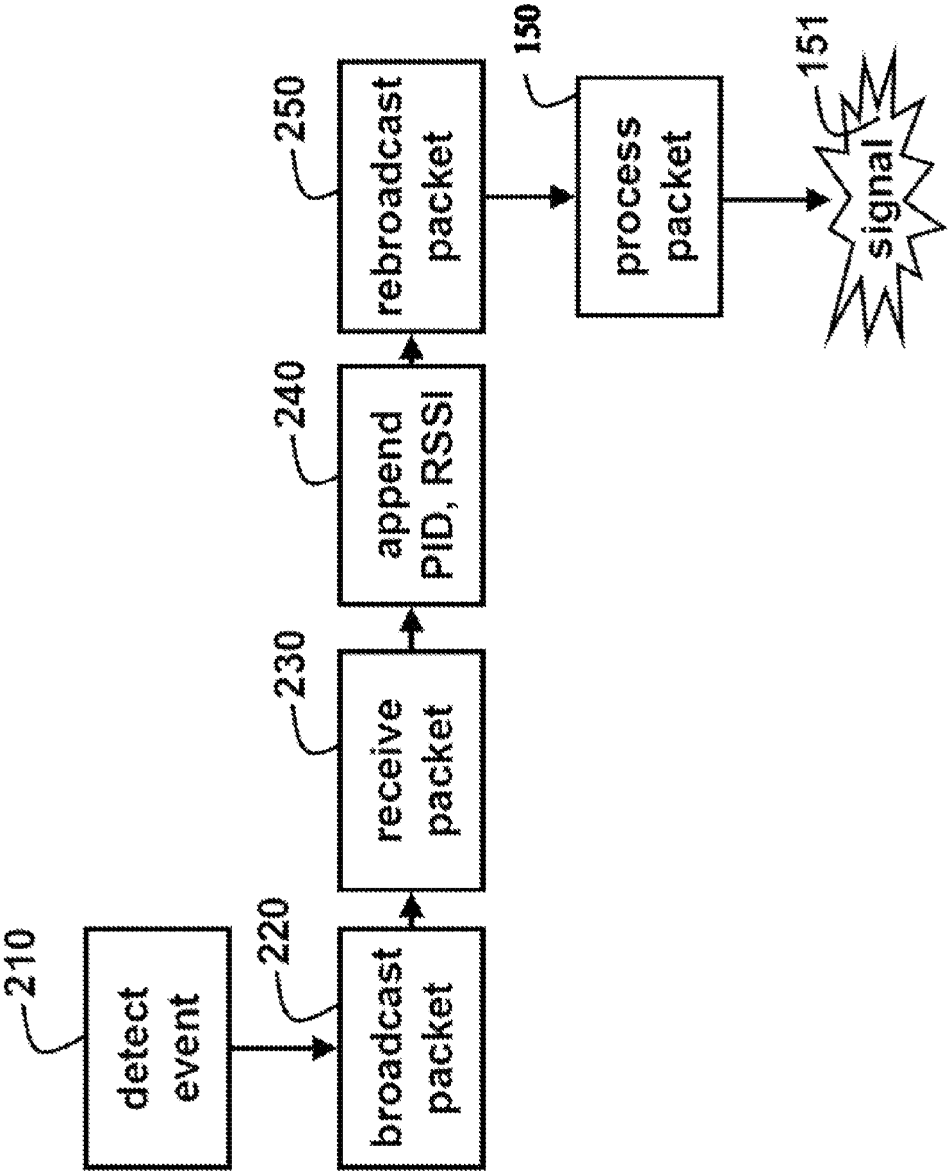
FIG. 2 is a flow diagram of a method for identifying authorized people in an environment according to an embodiment of the invention.

FIGS. 1-2 show a passive-active security system 100 and method 200 according to the embodiments of our invention. The system passively detects all people 102 in an environment 160, and actively identifies authorized people.

The embodiments use a wireless network of passive sensor nodes 101, and active badges 120. As an advantage, both the sensors and the badges are relatively inexpensive, making large-scale deployment of the security system a reality.

The passive network of our previous work is described in our U.S. Patent Publications 2008-0130949 and 2008-0130951, both incorporated herein by reference.

As shown in FIG. 1, the network includes the passive sensor nodes 101 arranged in the environment 160. Each battery-operated sensor node includes a wireless transceiver. The transceiver is designed according to the IEEE 802.15.4 standard, which specifies the physical layer and media access control for low-rate wireless networks. In free space, the range of the transceiver can be up to 100 m. In a large network, relay nodes can be used to interconnect all of the nodes.

The node also includes a passive motion sensor, e.g., an infrared detector. The detector has a range of only a few meters, hence detected object are well localized.

Each sensor is associated with a sensor identification number (SID) 111. The location of the sensor is known. The sensor detects 210 an event caused by an object 102, such as a person, moving within the short range of the sensors. The event has an associated time 112. A packet 110 including the SID 111 and time 112 is broadcast 220 by the sensor node in response to detecting the event. The packet can be further processed 150 to determine a trajectory 103 of the object over time. The processing can be centralized or distributed.

It should be noted, that this aspect of the invention detects all moving objects in the environment, whether or not the objects are authorized, i.e., associated with a badge.

An active badge 120 is arranged on an "authorized" object to be monitored. As defined herein, an authorized object is a person whose identity is known to the system.

The badge has an associated personnel identification number (PID) 113. The active badge receives 230 the packet 110 and determines a radio signal strength indicator (RSSI) 114 for the packet. The badge appends 240 the PID 113 and the RSSI 114 to the received packet, and rebroadcasts 250 the packet. The updated packet is received by the sensor, and rebroadcast so that it can be centrally processed 150 to track the object.

In response to the processing, the security system can generate various responses. If the detected person does not generate the appended packet, then the person is unknown or unauthorized and appropriate signals 151 can be generated depending on the location of the person, and further tracking can be performed while the unknown person remains in the environment. If there is an appended packet, then appropriate access to the environment can granted depending on the location of the person.

The RSSI 114 can be used to distinguish the case where the object is simultaneously detected by more than one sensor, or when another sensor detects an unrelated motion. In this case, the packet with the largest RSSI is from the nearest sensor.

The security system solves the problem where the environment admits unauthorized and authorized person. For example, a building can include authorized staff as well casual visitors. In this case, our system only signals an appropriate alarm if an unauthorized person is at an unauthorized location. In a retail setting, the presence of a customer can be detected and signaled to a sales person.

Applications that are enabled by our system include visitor and staff tracking in health care, educational, hospitality, military, law enforcement, home, industrial, and entertainment environments for routine as well as forensic applications.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system, wherein the system is configured to monitor an environment, comprising:

a network of sensors, wherein each sensor is passive and has an associated sensor identification number, and wherein the sensors are distributed in the environment; and a set of badges, wherein each badge is active and has an associated badge identification number, wherein each badge is associated with an object, and wherein a particular sensor broadcasts a packet in response to detecting a particular object, wherein the packet includes the sensor identification number and a time, and only if the particular object is associated with a particular badge then the badge appends the badge identification number to the packet and broadcasts the appended packet, and the particular sensor receives and rebroadcasts the appended packet for further processing to passively and actively monitor the environment.

2. The system of claim 1, wherein each sensor further comprises:

a motion sensor; and a wireless transceiver.

3. The system of claim 2, wherein the wireless transceiver operates according to the IEEE 802.15.4 standard.

4. The system of claim 2, further comprising:

relay nodes configured to interconnect all of the sensor nodes.

5. The system of claim 2, wherein the motion sensor further comprises:

an infrared detector.

6. The system of claim 1, further comprising:

a means for tracking the object over time using the packet broadcast by the sensor.

7. The system of claim 1, wherein the location of each sensor is known.

8. The system of claim 1, wherein the processing is centralized.

9. The system of claim 1, wherein the processing is distributed.

10. The system of claim 1, wherein the badge further comprises:

a radio-frequency identification (RFID) tag.

11. The system of claim 1, wherein the packet includes a radio signal strength indicator.

12. The system of claim 11, wherein the RSSI is used to determine a nearest sensor to the particular badge.

13. The system of claim 1, wherein the further processing generates an appropriate alarm signal.

14. The system of claim 1, wherein the sensors are distributed in health care, educational, hospitality, military, law enforcement, home, industrial, or entertainment environments.

15. The system of claim 1, further comprising:

a means for tracking the object over time using the packet rebroadcast by the sensor.

16. A method for monitoring an environment, comprising the steps of:

detecting an object in the environment by a sensor, wherein the sensor is passive and has an associated sensor identification number;

broadcasting initially a packet in response to detecting the object, wherein the packet includes a sensor identification number and a time;

receiving the packet by a badge associated with the object, wherein the badge is active and has an associated badge identification number;

broadcasting the packet by the badge after appending the badge identification number;

receiving and rebroadcasting the appended packet by the sensor for further processing to passively and actively monitor the environment.

* * * * *